United States Patent
Maehama et al.

(10) Patent No.: US 12,319,311 B2
(45) Date of Patent: Jun. 3, 2025

(54) RESOLUTION CONTROL DEVICE, AUTOMATIC DRIVING SYSTEM, AND RESOLUTION CONTROL METHOD

(71) Applicant: Hitachi Astemo, Ltd., Hitachinaka (JP)

(72) Inventors: Hiroki Maehama, Hitachinaka (JP); Takeshi Seta, Hitachinaka (JP); Hiroaki Ito, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 167 days.

(21) Appl. No.: 17/919,160

(22) PCT Filed: Feb. 2, 2021

(86) PCT No.: PCT/JP2021/003651
§ 371 (c)(1),
(2) Date: Oct. 14, 2022

(87) PCT Pub. No.: WO2021/210245
PCT Pub. Date: Oct. 21, 2021

(65) Prior Publication Data
US 2023/0159048 A1    May 25, 2023

(30) Foreign Application Priority Data
Apr. 15, 2020  (JP) .................. 2020-072659

(51) Int. Cl.
*B60W 60/00*  (2020.01)
*G06V 20/56*  (2022.01)

(52) U.S. Cl.
CPC ......... *B60W 60/001* (2020.02); *G06V 20/588* (2022.01)

(58) Field of Classification Search
CPC ... B60W 60/001; G06V 20/588; G06V 20/56; G06T 1/00; G06T 3/40; G08G 1/16
See application file for complete search history.

(56) References Cited

U.S. PATENT DOCUMENTS

2019/0198540 A1* 6/2019 Shibata ............... G06T 7/00
2019/0392226 A1* 12/2019 Takahashi ......... G06V 20/588

FOREIGN PATENT DOCUMENTS

JP  2005-092516 A  4/2005
JP  2007-214769 A  8/2007
(Continued)

OTHER PUBLICATIONS

English Translation of International Search Report issued in corresponding International Application No. PCT/JP2021/003651, dated Apr. 20, 2021.
(Continued)

*Primary Examiner* — Brian P Sweeney
(74) *Attorney, Agent, or Firm* — Foley & Lardner LLP

(57) ABSTRACT

Provided is a resolution control device that suppresses a processing load of output data by dynamically controlling a resolution at time of processing the output data of an external-environment sensor based on a traveling status. The resolution control device processes output data of an external-environment sensor that recognizes a surrounding environment of a vehicle and outputs the processed output data to an automatic driving device. The resolution control device includes a traveling status determination unit that determines a traveling status of the vehicle, and a control unit that extracts an attention region of the output data based on the traveling status, reduces a resolution of a region other than the attention region, and then outputs the region to the automatic driving device.

12 Claims, 6 Drawing Sheets

(56) References Cited

FOREIGN PATENT DOCUMENTS

| | | |
|---|---|---|
| JP | 2007-266703 A | 10/2007 |
| JP | 2010-267114 A | 11/2010 |
| JP | 2017-062638 A | 3/2017 |
| JP | 2020-004366 A | 1/2020 |
| WO | WO-2018/061740 A1 | 4/2018 |

OTHER PUBLICATIONS

Office Action issued in corresponding Japanese Patent Application No. 2022-515213, with English Machine Translation dated Oct. 3, 2023 (7 pages).

\* cited by examiner

RESOLUTION CONTROL DEVICE, AUTOMATIC DRIVING SYSTEM, AND RESOLUTION CONTROL METHOD

TECHNICAL FIELD

The present invention relates to a resolution control device, an automatic driving system, and a resolution control method for dynamically controlling a resolution of output data of an external-environment sensor mounted on a vehicle.

BACKGROUND ART

As a technique for suppressing a processing load of output data of an external-environment sensor (camera, LiDAR, and the like) mounted on a vehicle, techniques disclosed in PTL 1 and PTL 2 are known.

For example, the abstract of PTL 1 discloses that, as means for "enabling a driver to accurately grasp necessary information without increasing a processing load, by controlling video processing when an output video is generated in accordance with a driving situation of a vehicle", "a control unit 17 of a video processing device 10 determines the current driving situation of a vehicle based on various types of information input from the outside, and a resolution or a frame rate of at least a partial region of a vehicle surrounding bird-eye view video generated as the output video by an output video generation unit 15 is dynamically and variably controlled in accordance with the determination result".

In addition, the abstract of PTL 2 discloses that, as means for "providing a display control device capable of making an important region in a video higher in resolution than other regions even when the important region in the video moves", "a DSP 10 divides a region of a video captured by a camera 2 into a plurality of blocks, acquires a steering angle of a steering wheel of a vehicle detected by a steering angle sensor 20 provided in the vehicle via a CAN network 15, determines a thinning rate of each block based on the acquired steering angle, and performs thinning of video data corresponding to each block at the determined thinning rate".

CITATION LIST

Patent Literature

PTL 1: JP 2007-214769 A
PTL 2: JP 2007-266703 A

SUMMARY OF INVENTION

Technical Problem

In order to process high-resolution data output from an external-environment sensor, high arithmetic performance is required.

In PTL 1, the resolution or the frame rate of an entire region or a partial region (an output image of a certain camera among camera images forming a bird-eye view image) is dynamically controlled based on vehicle information and current position information with respect to the bird-eye view image generated from a plurality of cameras, and an increase in a processing load is suppressed. However, PTL 1 does not assume a case of controlling the resolution in consideration of a road type and a road structure on which the vehicle travels in an input from the single external-environment sensor, and thus there is still room for further suppressing the processing load.

Further, in PTL 2, with respect to an input of the single camera, a traveling direction of the vehicle is estimated based on a steering angle, and a region where resolution is reduced in the camera image is determined based on the steering angle. However, with only traveling direction information, it is not possible to extract a region requiring high resolution, which is specific to each road type and each road structure, such as a signal at an intersection and a junction point of an expressway. Therefore, there is still room for further suppressing the processing load in PTL 2.

Thus, an object of the present invention is to provide a resolution control device and a resolution control method for further suppressing a processing load of output data by dynamically controlling a resolution at the time of processing the output data of an external-environment sensor, based on a traveling status such as a road type or a road structure.

Solution to Problem

In order to solve the above problem, according to the present invention, a resolution control device processes output data of an external-environment sensor that recognizes a surrounding environment of a vehicle and outputs the processed output data to an automatic driving device. The resolution control device includes a traveling status determination unit that determines a traveling status of the vehicle, and a control unit that extracts an attention region of the output data based on the traveling status, reduces a resolution of a region other than the attention region, and then outputs the region to the automatic driving device.

Advantageous Effects of Invention

According to the resolution control device or the resolution control method of the present invention, it is possible to further suppress a processing load of output data by dynamically controlling a resolution at time of processing the output data of the external-environment sensor based on the traveling status such as a road type or a road structure. Objects, configurations, and advantageous effects other than those described above will be clarified by the descriptions of the following embodiments.

DESCRIPTION OF EMBODIMENTS

Hereinafter, a resolution control device and a resolution control method according to embodiments of the present invention will be described with reference to the drawings.

Embodiment 1

Figure 1:
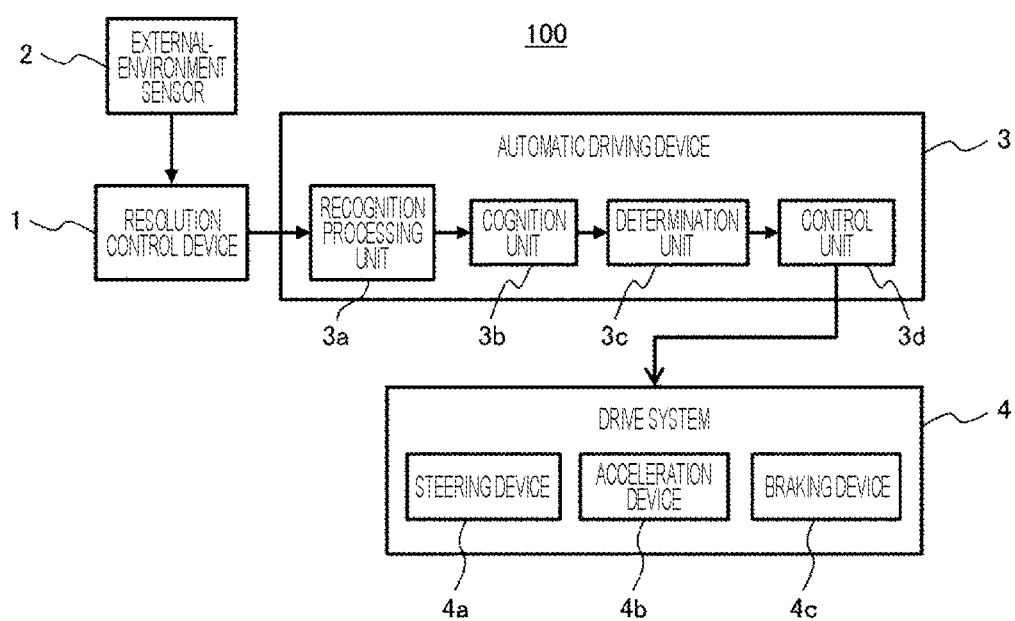
FIG. 1 is a functional block diagram of an automatic driving system 100 according to Embodiment 1.

FIG. 1 is a functional block diagram of an automatic driving system 100 to which a resolution control device 1 according to Embodiment 1 of the present invention is applied. As illustrated in FIG. 1, the automatic driving system 100 includes a resolution control device 1, an external-environment sensor 2, an automatic driving device 3, and a drive system 4.

The external-environment sensor 2 is a sensor for recognizing the surrounding environment (other vehicles, pedestrians, road shapes, white lines, traffic signs, traffic signals, and the like) of a vehicle, and is, for example, a camera (monocular, stereo, fisheye, or infrared), a LiDAR, a radar, a sonar, or the like. The camera outputs captured data obtained by capturing an image of the surrounding environment. The LiDAR, the radar, and the sonar output reflection intensity data of a measurement point group by laser light, radio waves, and sound waves reflected by the surrounding environment.

The automatic driving device 3 is a device that realizes automatic driving of the vehicle, and includes a recognition processing unit 3a, a cognition unit 3b, a determination unit 3c, a control unit 3d, and the like. Specifically, the automatic driving device 3 is a control unit such as an electronic control unit (ECU), which includes hardware such as an arithmetic device such as a CPU, a main storage device such as a semiconductor memory, an auxiliary storage device, and a communication device. The functions of the recognition processing unit 3a and the like are implemented in a manner that the arithmetic operation device executes a program loaded into the main storage device while referring to a database recorded in the auxiliary storage device. Description will be made below while a well-known technique in the computer field is appropriately omitted.

The drive system 4 is a mechanism group including a steering device 4a that controls a traveling direction of the vehicle, an acceleration device 4b that accelerates the vehicle, a braking device 4c that decelerates the vehicle, and the like. The drive system 4 is controlled in accordance with a command from the automatic driving device 3, thereby realizing automatic driving of the vehicle. The automatic driving device 3 and the drive system 4 in the present embodiment may be equivalent to those in the related art, and thus detailed description thereof will be omitted.

In a general automatic driving system, the high-resolution output data itself output from the external-environment sensor 2 is input to the automatic driving device 3, but, in this case, the automatic driving device 3 is required to have high arithmetic performance.

In the present embodiment, the resolution control device 1 is disposed between the external-environment sensor 2 and the automatic driving device 3, and a portion of the output data of the external-environment sensor 2 is reduced in resolution by the resolution control device 1 and then input to the automatic driving device 3. As a result, it is possible to suppress an arithmetic processing load in the automatic driving device 3 as compared with the case where the output data itself of the external-environment sensor 2 is processed. The resolution control device 1 in the present embodiment will be described in detail below.

<Configuration of Resolution Control Device 1>

The resolution control device 1 is a control unit that includes hardware such as an arithmetic device, a main storage device, an auxiliary storage device, and a communication device, and realizes various functions described later by executing a program. Although FIG. 1 illustrates the resolution control device 1 and the automatic driving device 3 as different control units, the functions of the resolution control device 1 and the automatic driving device 3 may be realized by one control unit.

Figure 2:
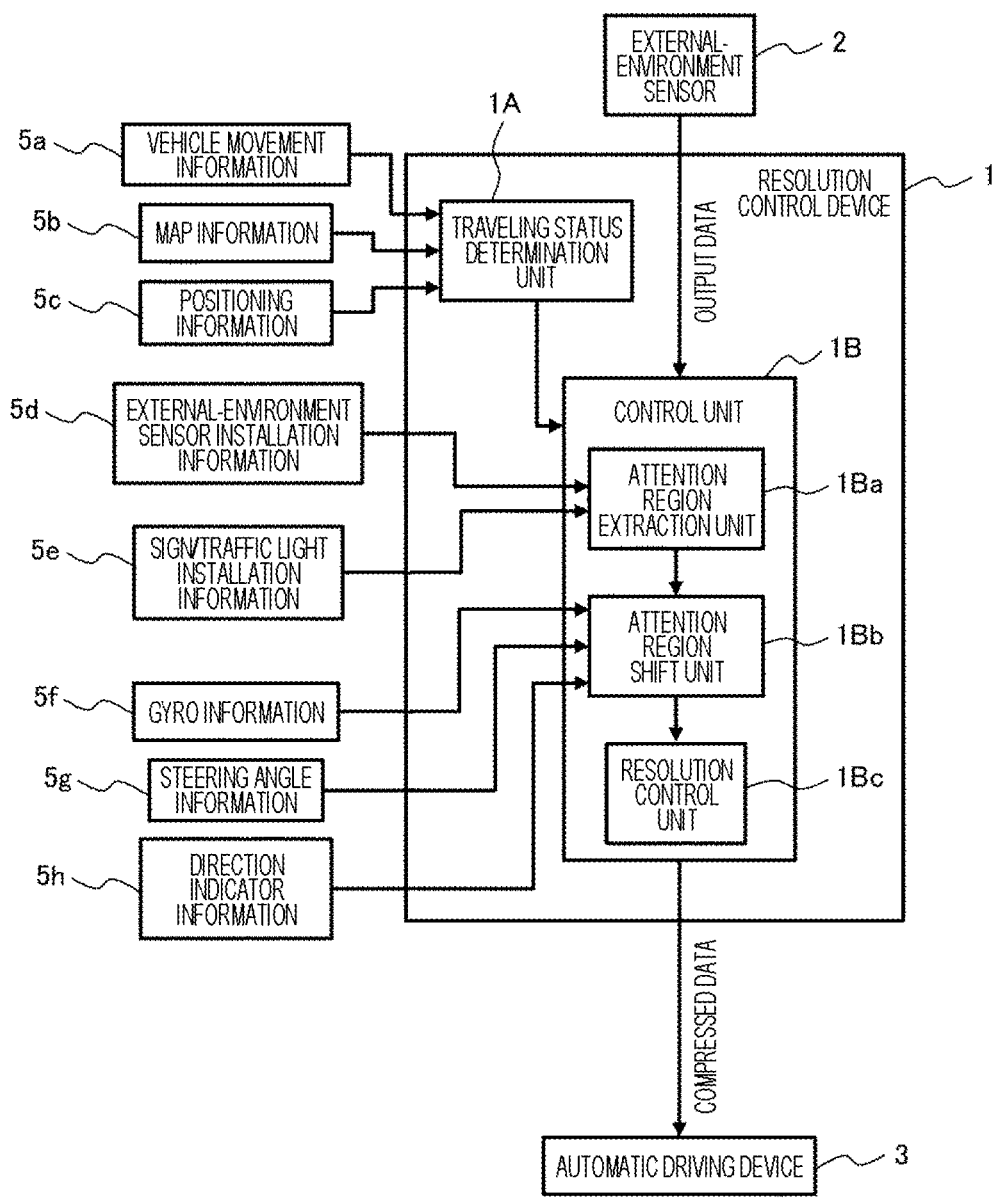
FIG. 2 is a functional block diagram of a resolution control device 1 in Embodiment 1.

FIG. 2 is a functional block diagram of the resolution control device 1 in the present embodiment. As illustrated here, the resolution control device 1 includes a traveling status determination unit 1A and a control unit 1B.

The traveling status determination unit 1A determines the traveling status of the vehicle based on vehicle movement information 5a, map information 5b, and positioning information 5c. The vehicle movement information 5a is information such as the speed and the acceleration of the vehicle that can be obtained from the control unit 3d of the automatic driving device 3 or the like. The map information 5b is information in which a road type, a road shape, or the like that can be obtained from a car navigation system or the like is registered. The positioning information 5c is current position information that can be obtained from a positioning sensor of a global navigation satellite system (GNSS) or the like.

Figure 3:
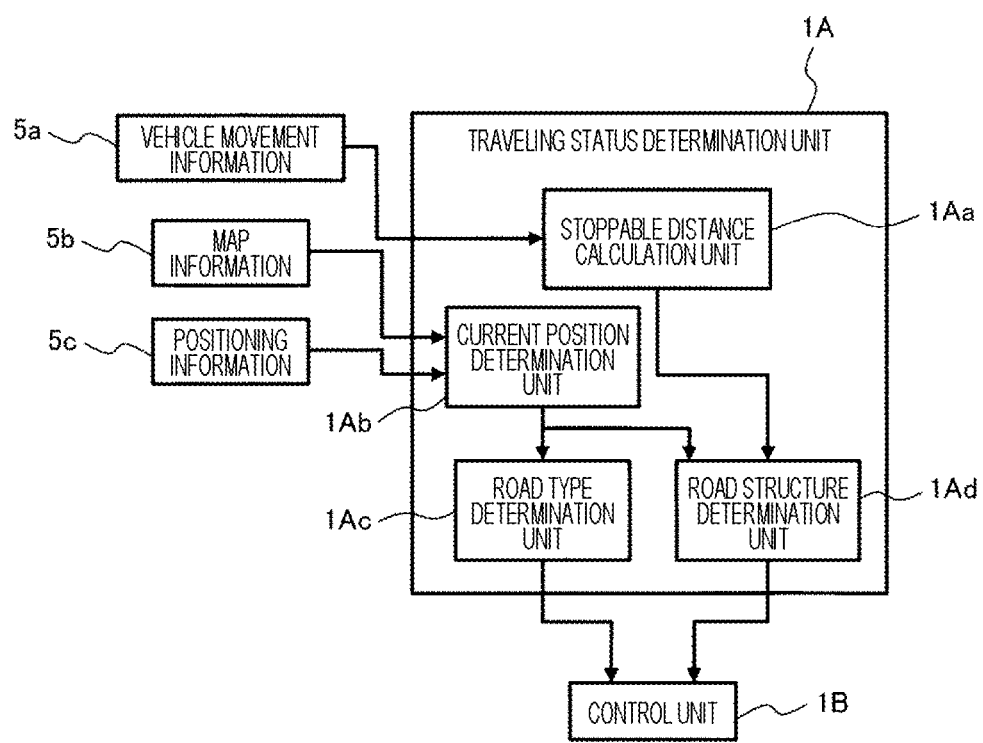
FIG. 3 is a functional block diagram of a traveling status determination unit 1A in Embodiment 1.

FIG. 3 is a functional block diagram illustrating details of the traveling status determination unit 1A. As illustrated here, the traveling status determination unit 1A includes a stoppable distance calculation unit 1Aa, a current position determination unit 1Ab, a road type determination unit 1Ac, and a road structure determination unit 1Ad. The stoppable distance calculation unit 1Aa determines the vehicle speed from the vehicle movement information 5a and determines a stoppable distance in accordance with the vehicle speed. The current position determination unit 1Ab determines the current position of the vehicle on a map from the map information 5b and the positioning information 5c. The road type determination unit 1Ac determines a road type (for example, an expressway or a general road, or a straight road or a curved road, and the like) of the road on which the vehicle travels, from the current position of the vehicle on the map. The road structure determination unit 1Ad determines a road structure (for example, a branch, a junction, an intersection, a crosswalk, a railroad crossing, a tollgate, and the like) in front of the vehicle on the map, from the stoppable distance and the current position of the vehicle. Therefore, the "traveling status" determined by the traveling status determination unit 1A is each piece of information of the vehicle speed, the stoppable distance, the current position, the road type, and the road structure.

On the other hand, the control unit 1B outputs a portion of the output data of the external-environment sensor 2 to the automatic driving device 3 as compressed data with a reduced resolution. The control unit 1B includes an attention region extraction unit 1Ba, an attention region shift unit 1Bb, and a resolution control unit 1Bc as illustrated in FIG. 2.

The attention region extraction unit 1Ba extracts an attention region having a high resolution in the output data of the external-environment sensor 2, based on the road type and the road structure, external-environment sensor installation information 5d, and sign/traffic light installation information 5e output by the traveling status determination unit 1A. The external-environment sensor installation information 5d is information regarding the installation position and the installation direction of the external-environment sensor 2 mounted on the vehicle. The sign/traffic light installation information 5e is information regarding the installation position and the installation height of a speed limit sign and traffic light.

The attention region shift unit 1Bb shifts or enlarges the attention region to have a more appropriate position and size, based on gyro information 5f output from a gyro sensor, steering angle information 5g output from a steering angle sensor, and direction indicator information 5h output from an direction indicator.

The resolution control unit 1Bc dynamically controls the resolution of the output data of the external-environment sensor 2 to generate compressed data in which the data volume is compressed. For example, while the resolution of the attention region in the output data is maintained at a high resolution, the resolution of a region other than the attention region is reduced. Alternatively, extraction data obtained by extracting only the attention region is generated, and the resolution of the entire output data is reduced. When the external-environment sensor 2 is a camera, the resolution reduction is processing of roughening the resolution and the frame rate of the captured data. In addition, when the external-environment sensor 2 is a LiDAR, a radar, or a sonar, the resolution reduction is processing of thinning out the measurement point group data by downsampling or voxelization.

The processing on the output data of the external-environment sensor 2 by the resolution control device 1 will be described with reference to FIGS. 4 and 5. In the following description, it is assumed that the external-environment sensor 2 is a monocular camera directed to the front of the vehicle, and the output data is captured data obtained by capturing an image of the front of the vehicle.

<Processing by Traveling Status Determination Unit 1A>

Figure 4:
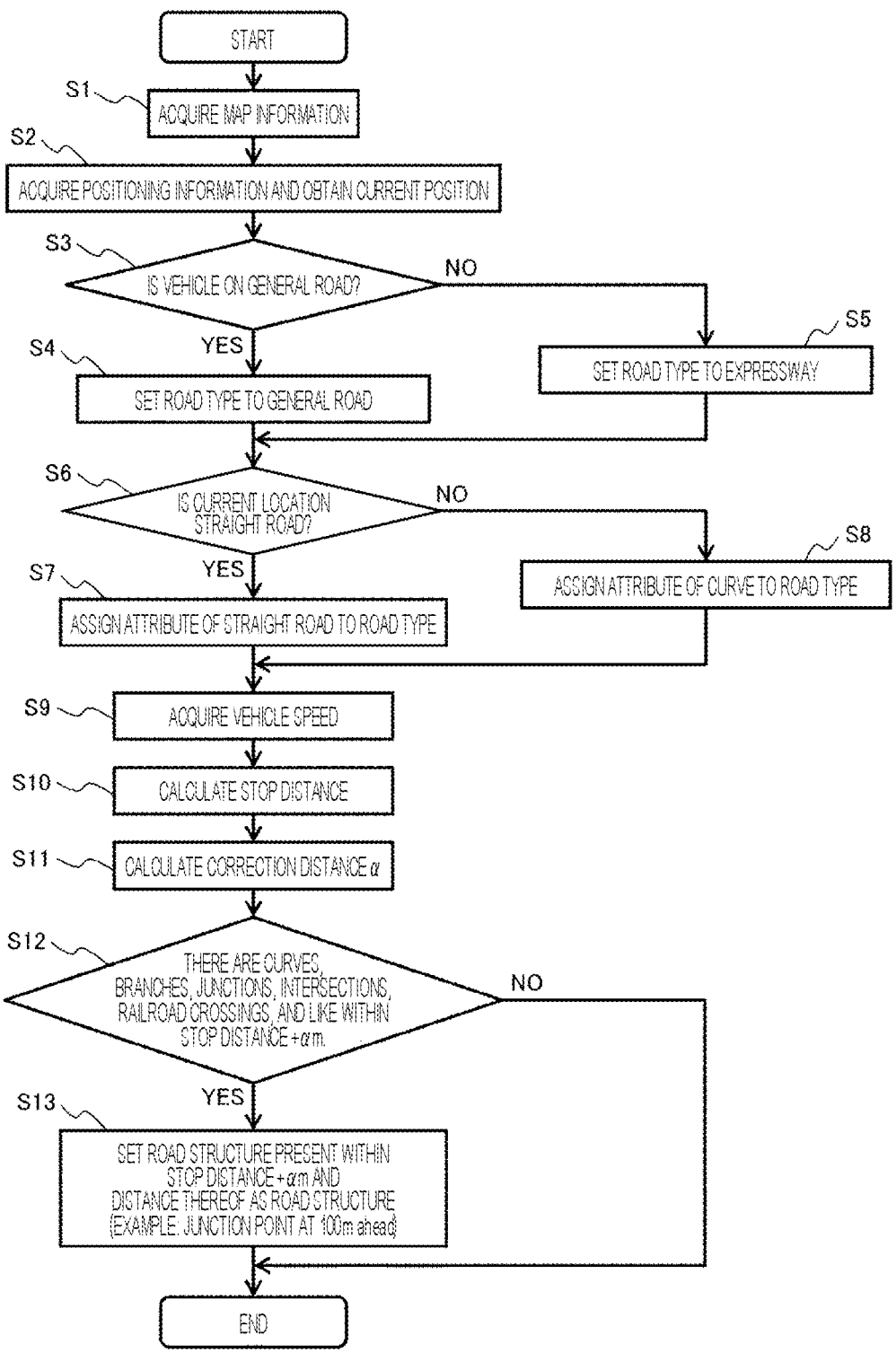
FIG. 4 is a flowchart illustrating processing by the traveling status determination unit 1A in Embodiment 1.

FIG. 4 is a flowchart illustrating an example of processing by the traveling status determination unit 1A. Each step will be sequentially described below.

Step S1: The current position determination unit 1Ab receives the map information 5b.

Step S2: The current position determination unit 1Ab receives the positioning information 5c and determines the current position of the vehicle on the map.

Step S3: The road type determination unit 1Ac determines whether the current position is on a general road or an expressway, based on the current position on the map, which has been obtained in Step S2. Then, when the current position is on the general road, the process proceeds to Step S4. When the current position is on the expressway, the process proceeds to Step S5.

Steps S4 and S5: The road type determination unit 1Ac sets the current road type to "general road" or "expressway" in accordance with the determination result in Step S3.

Step S6: The road type determination unit 1Ac determines whether the current position is on a straight road or a curved road, based on the current position on the map, which has been obtained in Step S2. Then, when the current position is on the straight road, the process proceeds to Step S7. When the current position is on the curved road, the process proceeds to Step S8.

Steps S7 and S8: The road type determination unit 1Ac assigns an attribute of "straight road" or "curved road" to the current road type in accordance with the determination result in Step S6.

Step S9: The stoppable distance calculation unit 1Aa acquires the vehicle speed from the vehicle movement information 5a.

Step S10: The stoppable distance calculation unit 1Aa calculates the stop distance. The stop distance is the sum of an idle running distance and a braking distance, and is, for example, 112 m in the case of a vehicle traveling at 100 km/hour.

Step S11: The stoppable distance calculation unit 1Aa calculates a correction distance $\alpha$. The correction distance $\alpha$ is a distance for securing a margin for safely stopping the vehicle during automatic driving, and is desirably a distance that allows the automatic driving device 3 to make at least two determinations during traveling of the correction distance $\alpha$. For example, when the vehicle speed is 100 km/hour (27.8 m/sec) and the determination cycle of the automatic driving device 3 is 100 m sec, the correction distance $\alpha$ is a distance of 5.56 m or more (for example, 6 m) calculated as 27.8 m/sec×100 msec×2 times.

Step S12: The road structure determination unit 1Ad determines whether or not there is a characteristic road structure (for example, a curve, a branch, a junction, an intersection, a crosswalk, a railroad crossing, a tollgate, and the like) within a range of the sum of the stop distance and the correction distance $\alpha$ from the current location on the map. Then, when there is the characteristic road structure, the process proceeds to Step S13. When there is no characteristic road structure, the process is ended.

Step S13: The road structure determination unit 1Ad sets a characteristic on the road structure and a distance to the characteristic, as a road structure. The road structure set here is, for example, "100 m ahead, junction point" or "70 m ahead, traffic light intersection".

As described above, when there is a characteristic road structure in front of the vehicle, the traveling status determination unit 1A sets the characteristic road structure as the road structure and then ends the processing in FIG. 4. When there is no characteristic road structure, the traveling status determination unit 1A ends the processing in FIG. 4 without setting the road structure.

<Processing by Control Unit 1B>

Figure 5:
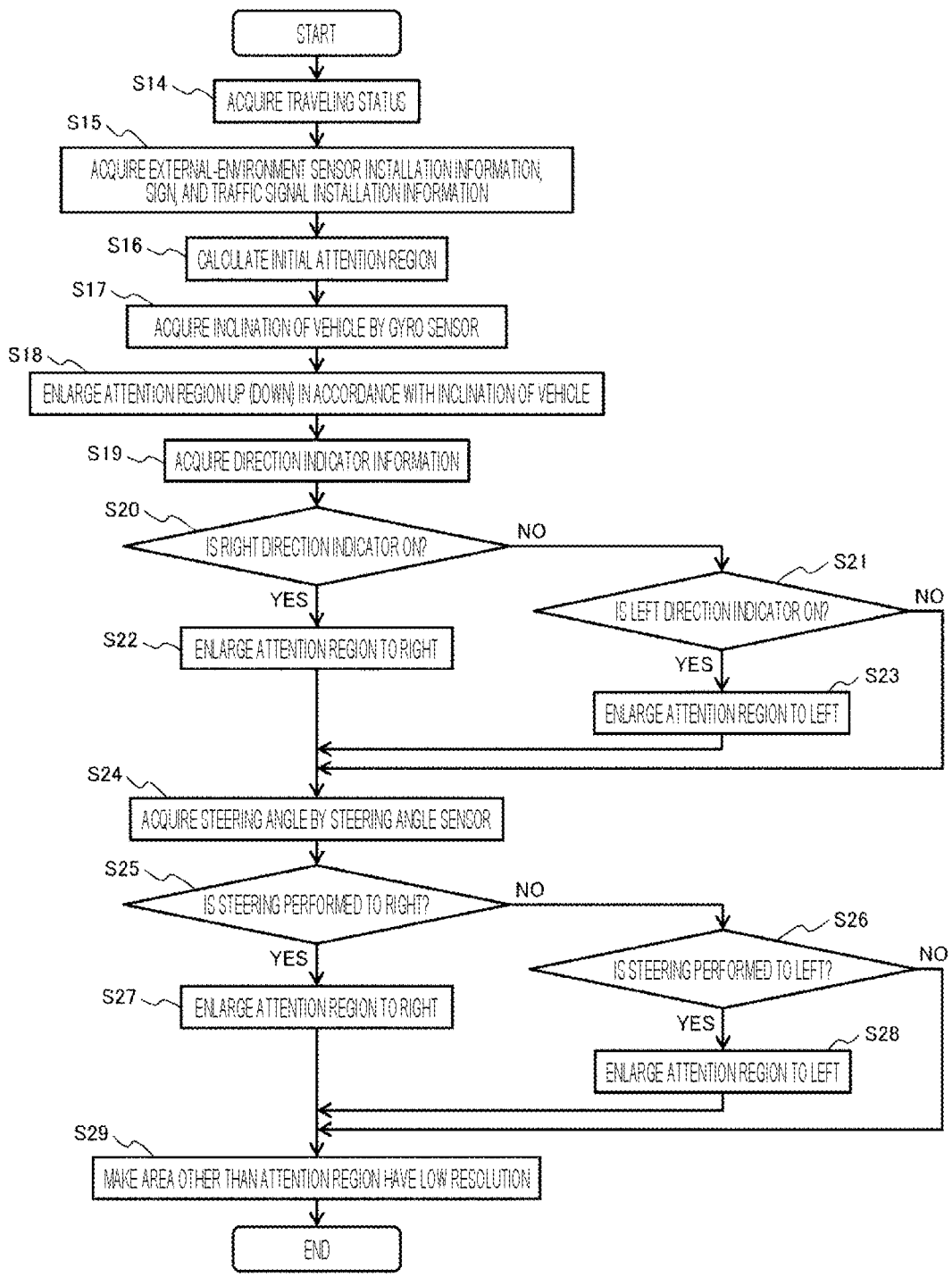
FIG. 5 is a flowchart illustrating processing by a control unit 1B in Embodiment 1.

FIG. 5 is a flowchart illustrating an example of processing by the control unit 1B. Each step will be sequentially described below. It is assumed that the processing in FIG. 4 has been ended prior to the processing in FIG. 5.

Step S14: The control unit 1B acquires the traveling status such as the vehicle speed, the road type, and the road structure from the traveling status determination unit 1A.

Step S15: The attention region extraction unit 1Ba acquires the external-environment sensor installation information 5d and the sign/traffic light installation information 5e.

Step S16: The attention region extraction unit 1Ba extracts an initial attention region based on the traveling status from the traveling status determination unit 1A, the external-environment sensor installation information 5d, and the sign/traffic light installation information 5e. For example, the initial attention region is extracted as follows.

Figure 6:
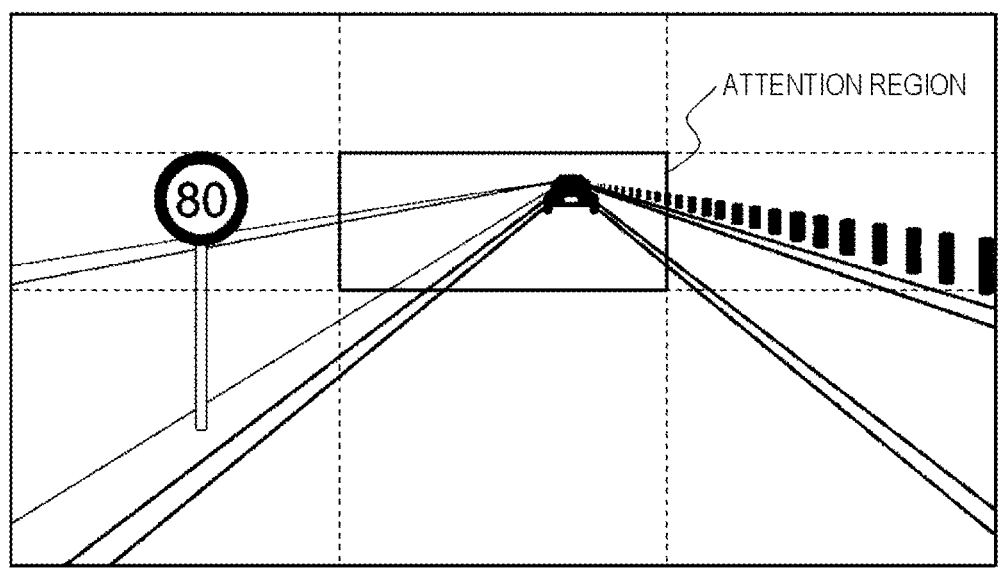
FIG. 6 illustrates an example of extracting an initial attention region in Step S16 of FIG. 5.

(1) When the traveling status is "speed: 100 km, expressway, straight road, and no characteristic road structure", a portion corresponding to 70 m ahead on the road, at which there is a high possibility that there is a preceding vehicle, is extracted as the attention region (see FIG. 6).

(2) When the traveling status is "70 km/h, expressway, straight road, 90 m ahead, junction point", a portion corresponding to the front junction point is extracted as the attention region.

(3) When the traveling status is "0 km/h (stopping), general road, 0 m ahead, traffic light intersection", a portion corresponding to the position of the front vehicle signal is extracted as the attention region.

Step S17: The attention region shift unit 1Bb acquires the inclination in a front-rear direction of the vehicle from the gyro information 5f.

Figure 7:
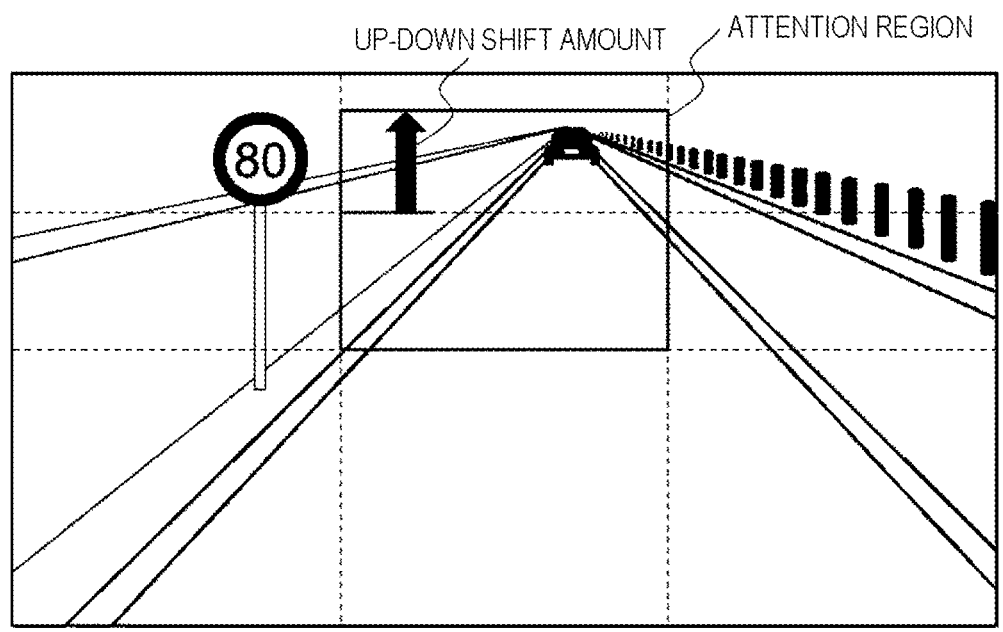
FIG. 7 is an enlarged example of an attention region in Step S18 of FIG. 5.

Step S18: The attention region shift unit 1Bb obtains an up-down shift amount based on the inclination of the vehicle, and enlarges the attention region upward or downward based on the up-down shift amount. FIG. 7 illustrates an example of the attention region after the initial attention region in FIG. 6 is enlarged in the upward direction. As a result, even when the vehicle leans forward, the preceding vehicle traveling on the straight road can be included in the attention region.

Step S19: The attention region shift unit 1Bb acquires the direction indicator information 5h.

Steps S20 and S21: The attention region shift unit 1Bb determines whether the direction indicator is ON, based on the left and right direction indicator information 5h.

Steps S22 and S23: The attention region shift unit 1Bb enlarges the attention region rightward or leftward in accordance with a direction in which the direction indicator is turned ON.

Step S24: The attention region shift unit 1Bb acquires the steering angle information 5g.

Steps S25 and S26: The attention region shift unit 1Bb obtains a steering direction and a steering amount from the steering angle information 5g.

Steps S27 and S28: The attention region shift unit 1Bb enlarges the attention region rightward or leftward in accordance with the steering direction and the steering amount.

Step S29: Finally, the resolution control unit 1Bc reduces the resolution of the region other than the attention region.

According to the procedures of FIGS. 4 and 5, the resolution control device 1 generates compressed data obtained by reducing the resolution of the output data of the external-environment sensor 2. As a result, the compressed data having a data volume compressed as compared with the output data of the external-environment sensor 2 is input to the automatic driving device 3. Thus, it is possible to reduce a basic arithmetic load required for transmission and reception of data in the automatic driving device 3 as a primary advantage.

In addition, the compressed data generated by the resolution control device 1 holds the attention region, which is highly likely to include the essential information (for example, information such as a preceding vehicle, a pedestrian, a branch, a junction, and a crosswalk) for realizing the automatic driving, with a high resolution. Thus, the recognition processing unit 3a of the automatic driving device 3 can analyze a region of interest in detail, and it is possible to realize the automatic driving with high accuracy at the same level as the automatic driving system using the output data itself of the external-environment sensor 2, while suppressing the arithmetic load.

In the present embodiment, the configuration in which the resolution control device 1 in the present invention is applied to the automatic driving system 100 has been exemplified, but the resolution control device 1 in the present invention may be applied to a driving assistance system. In such a driving assistance system, it is possible to provide the driver with driving assistance information (warning or the like) of high quality equivalent to that in the related art while reducing the arithmetic load of a driving assistance device.

Embodiment 2

Embodiment 2 of the present invention will be described. The repetitive description of common points with Embodiment 1 will be omitted.

In Embodiment 1, the configuration in which the external-environment sensor 2 is provided in front of a vehicle is assumed. However, the external-environment sensor 2 is not limited to being provided in front of the vehicle, and may be provided on the side or the rear, for example.

Even when the external-environment sensor 2 directed to the side or the external-environment sensor 2 directed to the rear is used, similarly to Embodiment 1, by setting the attention region at any position in accordance with the traveling status or the like, or by shifting the attention region up, down, left, or right, it is possible to realize a lane change or reverse parking with the same accuracy as that when the output data itself is used, while compressing the data volume.

Embodiment 3

Embodiment 3 of the present invention will be described. The repetitive description of common points with the above embodiments will be omitted.

In FIGS. 6 and 7 in Embodiment 1, one attention region is extracted from the captured data, but a plurality of attention regions may be extracted. For example, when the traveling status is "40 km/h, general road, straight road, 70 m ahead, crosswalk", two of regions including the speed limit sign and regions including the crosswalk may be extracted as the attention region in the output data of the external-environment sensor 2.

As a result, even when there is a plurality of regions requiring detailed analysis, it is possible to maintain the quality of automatic driving while suppressing the arithmetic load.

Embodiment 4

Embodiment 4 of the present invention will be described. The repetitive description of common points with the above embodiments will be omitted.

The resolution of the output data of the external-environment sensor 2 is reduced by the resolution control device 1 in Embodiment 1, but the resolution control device 1 in the present embodiment does not perform the resolution reduction and only extracts the attention region. When the resolution control device 1 is used, the processing for reducing the arithmetic load is performed by the external-environment sensor 2 or the automatic driving device 3.

That is, the external-environment sensor 2 in the present embodiment collects data with a high resolution as in the related art for the attention region and collects data with a low resolution for regions other than the attention region, based on attention region information received from the resolution control device 1. As a result, it is possible for the external-environment sensor 2 to directly generate the output data corresponding to the compressed data generated by the resolution control device 1 in Embodiment 1.

In addition, the automatic driving device 3 in the present embodiment analyzes the output data with high accuracy as in the related art for the attention region and analyzes the output data with low accuracy for regions other than the attention region, based on the attention region information received from the resolution control device 1. As a result, similarly to Embodiment 1, it is possible to maintain the quality of the automatic driving while suppressing the arithmetic load in the automatic driving device 3.

Embodiment 5

Embodiment 5 of the present invention will be described. The repetitive description of common points with the above embodiments will be omitted.

In Embodiment 1, the configuration in which, when the external-environment sensor 2 is a camera and the output data is captured data, the resolution reduction is realized by roughening the resolution or the frame rate of the captured data has been described. However, the method for reducing the resolution is not limited to this example. For example, the gradation of color information of the three primary colors of the captured data may be changed from 256 gradations to 16 gradations. Alternatively, in the case of a LiDAR, a radar, or a sonar, the gradation of the reflection intensity of the measurement point group data may be roughened.

The present invention is not limited to the above embodiments, and various modification examples may be provided. For example, the above embodiments are described in detail in order to explain the present invention in an easy-to-understand manner, and the above embodiments are not necessarily limited to a case including all the described configurations. Further, some components in one embodiment can be replaced with the components in another embodiment, and the configuration of another embodiment can be added to the configuration of one embodiment. Regarding some components in the embodiments, other components can be added, deleted, and replaced. Some or all of the configurations, functions, functional units, processing means, and the like may be realized in hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a recording device such as a hard disk and a solid state drive (SSD), or a recording medium such as an IC card, an SD card, and a DVD.

REFERENCE SIGNS LIST

100 automatic driving system
1 resolution control device
1A traveling status determination unit
1Aa stoppable distance calculation unit
1Ab current position determination unit
1Ac road type determination unit
1Ad road structure determination unit
1B control unit
1Ba attention region extraction unit
1Bb attention region shift unit
1Bc resolution control unit
2 external-environment sensor
3 automatic driving device
3*a* recognition processing unit
3*b* cognition unit
3*c* determination unit
3*d* control unit
4 drive system
4*a* steering device
4*b* acceleration device
4*c* deceleration device

The invention claimed is:

1. A resolution control device that processes output data of an external-environment sensor that recognizes a surrounding environment of a vehicle and outputs the processed output data to an automatic driving device, the resolution control device comprising a processor coupled to a memory, configured to:
determine a traveling status of the vehicle; and
extract an attention region of the output data based on the traveling status, reduce a resolution of a region other than the attention region, and then output, after reducing the resolution of the region, the region to the automatic driving device, wherein
the attention region is shifted or enlarged,
an up-down shift amount of the attention region is calculated based on inclination information of the vehicle, and
the attention region is shifted or enlarged in an upward direction or a downward direction.

2. The resolution control device according to claim 1, wherein the processor is further configured to:
acquire map information and positioning information and determines a current position of the vehicle on a map,
determine a road type of a road on which the vehicle travels from the map information and the current position,
when a characteristic road structure is included within a range of a sum of a stop distance and a correction distance from the current position, output the characteristic road structure as the traveling status, and
extract the attention region based on the characteristic road structure.

3. The resolution control device according to claim 2, wherein the characteristic road structure is any one of a curve, a branch, a junction, an intersection, a crosswalk, a railroad crossing, and a tollgate.

4. The resolution control device according to claim 1, wherein the processor is further configured to:
calculate a left-right shift amount of the attention region based on direction indicator information or steering angle information, and shift or enlarge the attention region in a leftward direction or a rightward direction.

5. The resolution control device according to claim 1, wherein
the external-environment sensor is a camera, and
the resolution reduction is processing of roughening a resolution and a frame rate of captured data of the camera, or processing of roughening a gradation of color information.

6. The resolution control device according to claim 1, wherein
the external-environment sensor is any one of a LiDAR, a radar, and a sonar, and
the resolution reduction is processing of thinning measurement point group data of the LiDAR, the radar, and the sonar by downsampling or voxelization, or processing of roughening a gradation of reflection intensity.

7. The resolution control device according to claim 1, wherein the external-environment sensor is installed on any one of a front, a side, and a rear of the vehicle.

8. The resolution control device according to claim 1, wherein the processor is further configured to extract a plurality of attention regions.

9. An automatic driving system comprising:
an external-environment sensor that recognizes a surrounding environment of a vehicle;
a resolution control device that processes output data of the external-environment sensor; and
a self-driving device that automatically drives the vehicle based on the output data of the external-environment sensor, wherein
the resolution control device comprising a processor coupled to a memory, configured to:
determine a traveling status of the vehicle, and extract an attention region of the output data based on the traveling status and output information of the attention region to outside, wherein the attention region is shifted or enlarged, and an up-down shift amount of the attention region is calculated based on inclination information of the vehicle, and the attention region is shifted or enlarged in an upward direction or a downward direction.

10. The automatic driving system according to claim 9, wherein the external-environment sensor that has received the information of the attention region collects data with high resolution for the attention region and collects data with lower resolution than the resolution of the attention region for regions other than the attention region.

11. The automatic driving system according to claim 9, wherein the self-driving device that has received the information of the attention region analyzes the attention region of the output data with high accuracy and analyzes a region other than the attention region of the output data with lower accuracy than the accuracy of the attention region.

12. A resolution control method of processing output data of an external-environment sensor that recognizes a surrounding environment of a vehicle and outputting the processed output data to an automatic driving device, the resolution control method comprising:

determining, by a processor coupled to a memory, a traveling status of the vehicle; and extracting, by the processor, an attention region of the output data based on the traveling status; and reducing, by the processor, a resolution of a region other than the attention region, and then outputting, by the processor, the region to the automatic driving device, wherein the attention region is shifted or enlarged, an up-down shift amount of the attention region is calculated based on inclination information of the vehicle, and the attention region is shifted or enlarged in an upward direction or a downward direction.

* * * * *